No. 606,650. Patented July 5, 1898.
L. DOHM & C. H. SCHLUNDT.
BICYCLE LOCK.
(Application filed Dec. 21, 1896.)
(No Model.) 2 Sheets—Sheet 1.
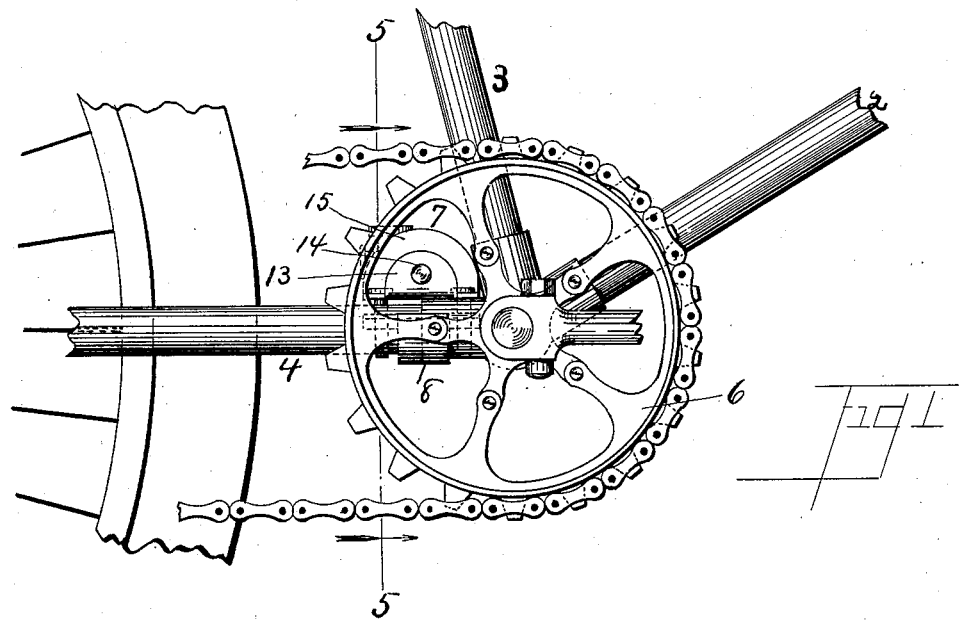
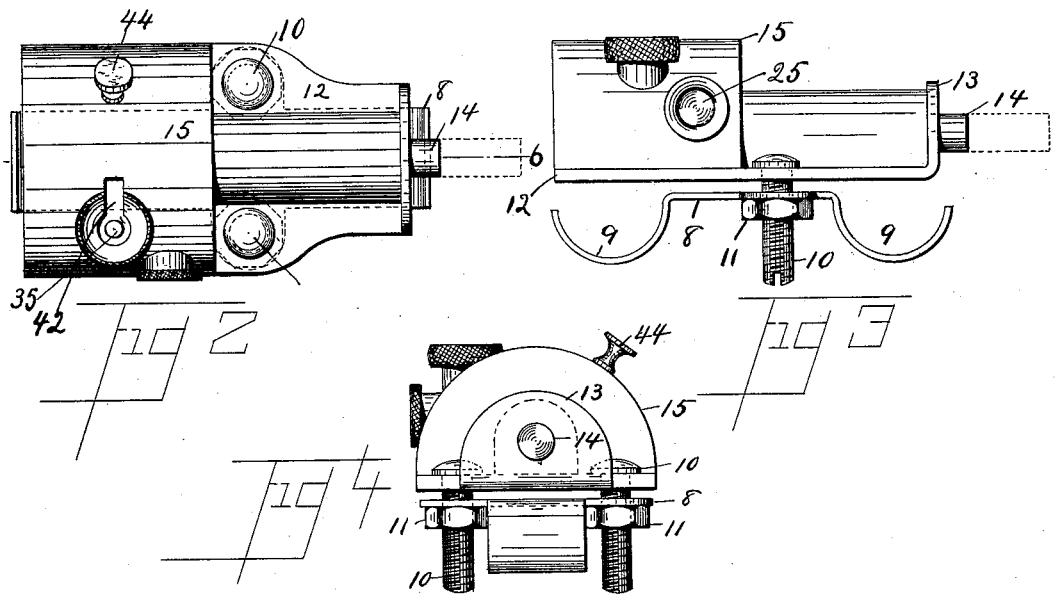
WITNESSES: INVENTORS
LOUIS DOHM, AND
CHARLES H. SCHLUNDT.
by Oscar A. Michel & Co., ATTORNEYS.

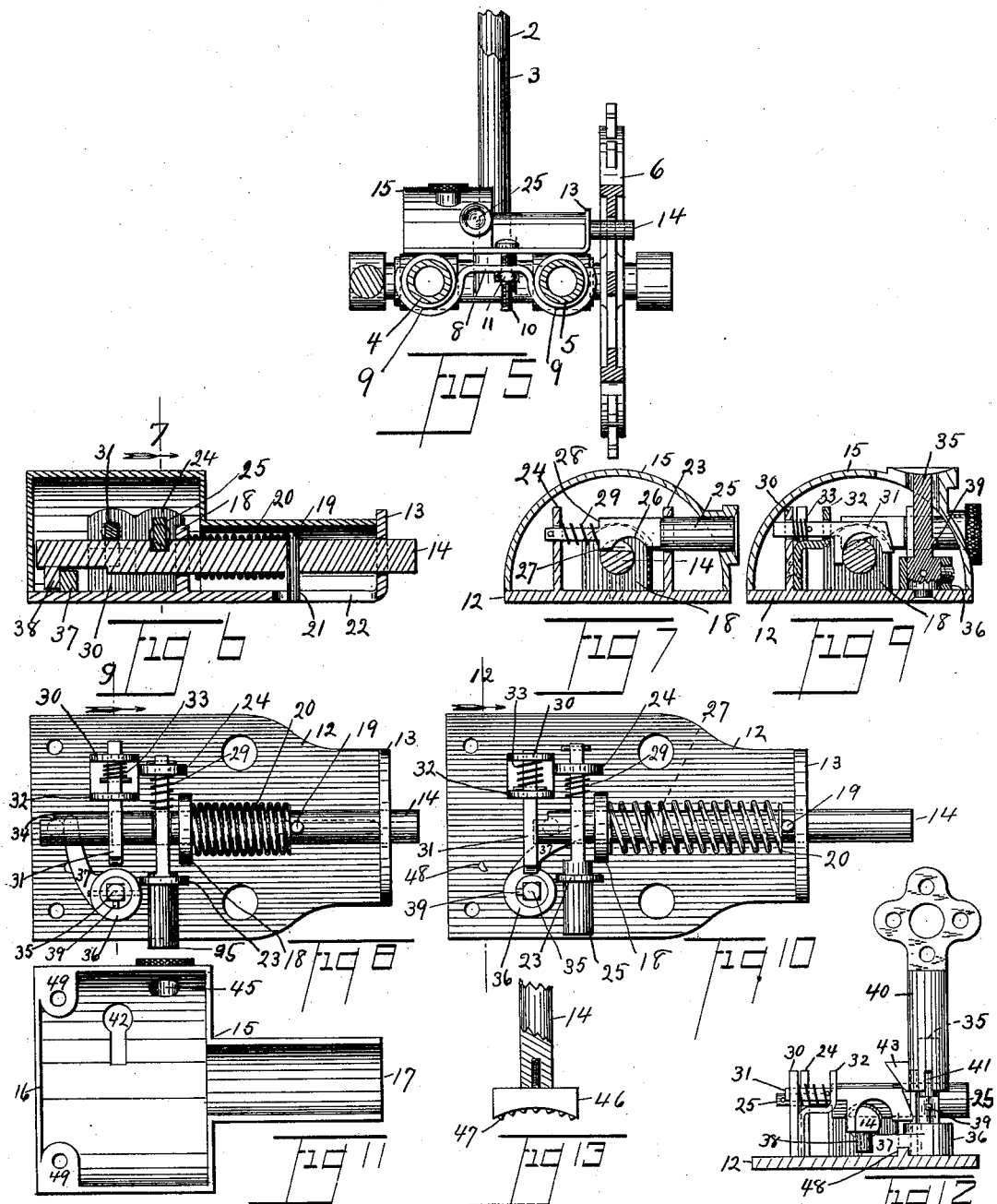

UNITED STATES PATENT OFFICE.

LOUIS DOHM AND CHARLES H. SCHLUNDT, OF RAHWAY, NEW JERSEY.

BICYCLE-LOCK.

SPECIFICATION forming part of Letters Patent No. 606,650, dated July 5, 1898.

Application filed December 21, 1896. Serial No. 616,385. (No model.)

*To all whom it may concern:*

Be it known that we, LOUIS DOHM and CHARLES H. SCHLUNDT, citizens of the United States, residing at Rahway, in the county of Union and State of New Jersey, have invented certain new and useful Improvements in Bicycle-Locks; and we do hereby declare the following to be a full, clear, and exact description of the invention, such as will enable others skilled in the art to which it appertains to make and use the same, reference being had to the accompanying drawings, and to numerals of reference marked thereon, which form a part of this specification.

The object of our invention is to secure a new and useful improvement in locks for bicycles that can be secured on any part of the frame, so as to come in contact with the periphery of the tire or with the spokes of the sprocket-wheel, as shown, and has for its object greater simplicity, cheapness, and durability, as well as to facilitate locking and unlocking the wheel.

With these ends in view our invention consists of the peculiar features and combination of parts more fully described hereinafter and finally pointed out in the clauses of the claim.

Referring to the accompanying drawings, embracing two sheets, in which like numerals of reference indicate corresponding parts in each of the several views where they occur, Figure 1 is a side elevation, reduced, of an ordinary safety-bicycle, some of the parts being omitted and broken off, showing an end elevation of our improved lock secured to the frame just back of the rear rod of the frame, so as to come in contact with the spokes of the sprocket-wheel. Fig. 2 is an enlarged top plan view of our lock removed from the bicycle, showing in dotted lines the sliding bolt as in a locked position. Fig. 3 is a side elevation of same. Fig. 4 is a front end elevation of Fig. 3. Fig. 5 is a vertical section on the line 5 5, looking in the direction of the arrow in Fig. 1. Fig. 6 is a vertical section on the line 6 6 of Fig. 2. Fig. 7 is a cross-section on the line 7 7 of Fig. 6. Fig. 8 is a top plan view of the lock, having the hood or covering removed to show the working parts when the lock is open. Fig. 9 is a cross-section on the line 9 9 of Fig. 8, having the hood attached. Fig. 10 is a top plan view similar to Fig. 8, but showing the sliding bolt extended as in a locked position. Fig. 11 is an inverted view of the hood or covering on the line 12 12 of Fig. 10 and showing the key in position on the key-post ready for opening the lock. Fig. 12 is a section on line 12, Fig. 10, looking as indicated by the arrow. Fig. 13 is a modification of the sliding bolt, partly in section, when the same is being used against the periphery of the tire.

In said drawings, 2, 3, 4, and 5 represent rods forming the frame of an ordinary bicycle, such as are commonly called "safety," having the sprocket-wheel 6 secured in the usual manner. Upon the parts 4 and 5 of the frame is secured the locking device 7, having a plate 8 with curved recess 9 for the reception of the parts 4 and 5 when the bolt 10 is screwed home by the nut 11, as shown in Fig. 5.

The locking device 7 is composed of a bottom plate 12, having one end 13 turned up, so as to form a bearing through which the sliding bolt 14 passes, and also serves to prevent dirt or any other foreign matter from entering the lock. Upon this plate 12 is secured the hood or covering 15, having one end 16 closed and the other end 17 opened, which is closed by the turned-up portion 13 of the plate 12. To this plate 12 is secured the post 18, through which the sliding bolt passes. On this sliding bolt 14 is secured a pin projection 19, which is used both for holding the coil-spring 20 in place and having its lower end 21 work in the longitudinal slot 22 on the plate 12, thereby keeping the bolt in one position when the same is being operated.

To the plate 12 are permanently secured uprights 23 and 24, through which the push-rod 25 passes, said push-rod being provided on the under side with curved recess 26, so that when the push-rod is released from the recess 27 on the sliding bolt 14 the bolt will slide forward through said groove and on one of said rod projections 28, which serves as a backing for one end of the coil-spring 29, and the other end, which bears against the upright 24. 30 is another upright for the locking-bolt 31, to which is secured the arm 32, which is bent out and then up, as shown in Figs. 8, 9, 10, and 12, as bearing-surfaces for the coil-spring 33. Said sliding bolt 14 is provided on the upper surface with a recess 27, into which the push-rod 25 rests when the bolt is drawn back, thus unlocking the machine, and the rear portion of said bolt being cut away to form the shoulder 34, against which the locking-bolt 31 rests when the bolt 14 is extended or in a locked position, as shown in Figs. 10 and 12, thus preventing the bolt 14 from being pushed back without the aid of the key. In the front of said locking-bolt 31 is secured to the said plate 12 the revolving key-post 35, having secured at the lower end thereof the lever 36, having the arm 37 extending out and under the sliding bolt 14 and against the projection 38, secured to the under side of said bolt 14, as fully shown in Figs. 8, 10, and 12 of the drawings. On this revolving key-post 35 is secured a projection 39, which serves as a guide for the key 40, having a slot or opening 41 at the lower end of said key. This projection and slot may be put at any place on the key-post and key to suit the manufacturer, so that each lock will require a different key, thereby preventing the lock from being picked with an ordinary key, as will be manifest.

In locking the device the push-rod 25 is pressed in, thus releasing the sliding bolt 14 from said rod, which bolt, by the action of the coil-spring 20 upon the bolt, will force the same outward between the spokes of the sprocket-wheel, and when the rear portion of said bolt passes the locking-bolt 31 the action of the coil-spring 33, secured thereon, will force the same out and lock the bolt, so that the same cannot be pushed back without the regular key.

To unlock the wheel, the key is inserted through the opening 42 in the hood 15, so that the slot or opening 41 in the key will come directly over the projection 39 on the key, and by pressing down upon the key the locking-bolt 31 is pushed back by the action of the key portion 43, and then giving the key a quarter-turn to the left the arm 37 of the lever 36, being in contact always with the projection 38 on the bolt 14, will draw the same back to its normal position.

On one side of the hood or covering 15 is secured a set-screw 44, which is intended to hold a rubber or any other textile material over the key-opening 42 and the push-rod opening 45, thus preventing any dirt or other foreign matter from entering or lodging upon the working parts, the other end of said material being secured in any well-known manner on the plate 12, as will be clearly understood by referring to the drawings.

We do not limit ourselves to the exact construction as shown, as various changes may be made without departing from the spirit of our invention.

The lock can also be secured on the front fork of the bicycle or directly beneath the seat, the sliding bolt 14 having the curved head 46, with teeth or projections 47, so that when the rider desires to lock his wheel it will only be necessary for him to push the push-rod 25 in, thereby releasing the said bolt 14, which by the action of the coil-spring 20 will force the teeth or projections to impinge the tire and thus lock the same.

Having thus described our invention, what we claim as new, and desire to secure by Letters Patent of the United States, is—

1. In a bicycle-lock, the frame which is adapted to be clamped to the frame of the bicycle, a longitudinally-moving spring-actuated bolt which has one of its ends to project beyond the end of the lock-frame, and provided with a groove in its upper side, and a projection at its inner end, combined with a pivoted lever for catching against the projection and forcing the bolt inwardly, a spring-actuated push-rod provided with a recess in its under side to straddle over the top of the bolt, and which is adapted to catch in the groove in the top of the sliding bolt to hold said bolt retracted, and a locking-bolt which is grooved on its under side, and which is adapted to catch against the inner end of the bolt, and prevent it from being forced inwardly, substantially as described.

2. In a lock, a suitable base-plate which is adapted to be clamped to the frame of the bicycle, and which is provided with ears or projections upon its upper side, and having its outer end turned upwardly so as to form a guiding-flange for the bolt, and an endwise-moving spring-actuated locking-bolt which has one of its ends to always project beyond the frame, and which bolt is provided with a groove in its top, and a projection extending from the lower side of its inner end, combined with a pivoted lever for catching against the bolt, and forcing the bolt inwardly, a spring-actuated push-rod placed at right angles to the sliding bolt, and provided with a recess in its lower edge so as to straddle over the bolt, and which is adapted to catch in a groove in the top of said bolt to hold the bolt retracted, and a locking-bolt which is also grooved on its under side, and which is adapted to catch against the inner end of the bolt to prevent it from being forced inwardly; the locking-bolt and the push-rod being adapted to alternately engage with the main bolt, substantially as specified.

In testimony that we claim the invention set forth above we have hereunto set our hands this 27th day of November, 1896.

LOUIS DOHM.
CHARLES H. SCHLUNDT.

Witnesses:
OSCAR A. MICHEL,
JOSEPH BOYLE.